United States Patent [15] 3,675,232

Strout [45] July 4, 1972

[54] VIDEO GENERATOR FOR DATA DISPLAY

[72] Inventor: Frederick D. Strout, Phoenix, Ariz.

[73] Assignee: General Electric Company

[22] Filed: May 21, 1969

[21] Appl. No.: 826,332

[52] U.S. Cl. ....................................... 340/324 A, 340/172.5
[51] Int. Cl. .......................................................... G06f 3/14
[58] Field of Search .................... 340/324.1, 324 A; 178/6.6, 178/6.7; 95/4.5 R

[56] References Cited

UNITED STATES PATENTS

| | | | |
|---|---|---|---|
| 3,539,999 | 11/1970 | Houldin et al | 340/324 A X |
| 3,540,031 | 11/1970 | Love | 340/324 A |
| 3,307,156 | 2/1967 | Durr | 340/324 A X |
| 3,413,610 | 11/1968 | Botjer et al | 340/324 A X |
| 3,345,458 | 10/1967 | Cole et al | 340/324 X |
| 3,388,391 | 6/1968 | Clark | 340/324 |
| 3,396,377 | 8/1968 | Strout | 340/324 |
| 3,400,377 | 9/1968 | Lee | 340/324 X |

*Primary Examiner*—David L. Trafton
*Attorney*—Norman C. Fulmer, Carl W. Baker, Frank L. Neuhauser, Oscar B. Waddell and Joseph B. Forman

[57] ABSTRACT

Video generator circuitry is disclosed for converting randomly occurring input data information into a time-sequential digital video display output signal. The circuits include a video image buffer of relatively small storage capacity which converts random video signals into a sequential video output signal suitable for displaying the data (such as numerals, letters, vectors, pictures, or special characters) on a scanned-raster cathode-ray tube or other display device. The aforesaid random video signals are produced by means including video pattern generators and a data buffer having a thread address means for sorting the randomly provided input data into proper groupings for writing information into the video image buffer.

9 Claims, 8 Drawing Figures

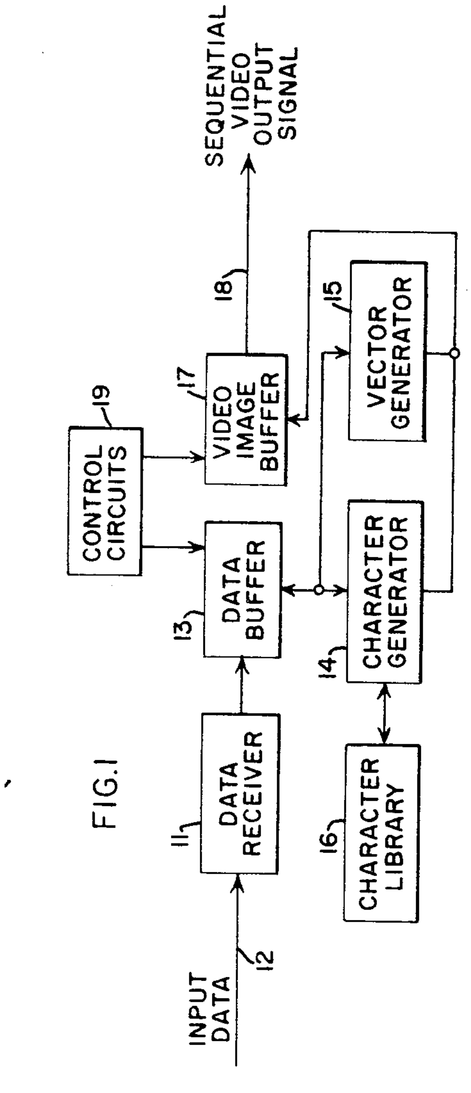
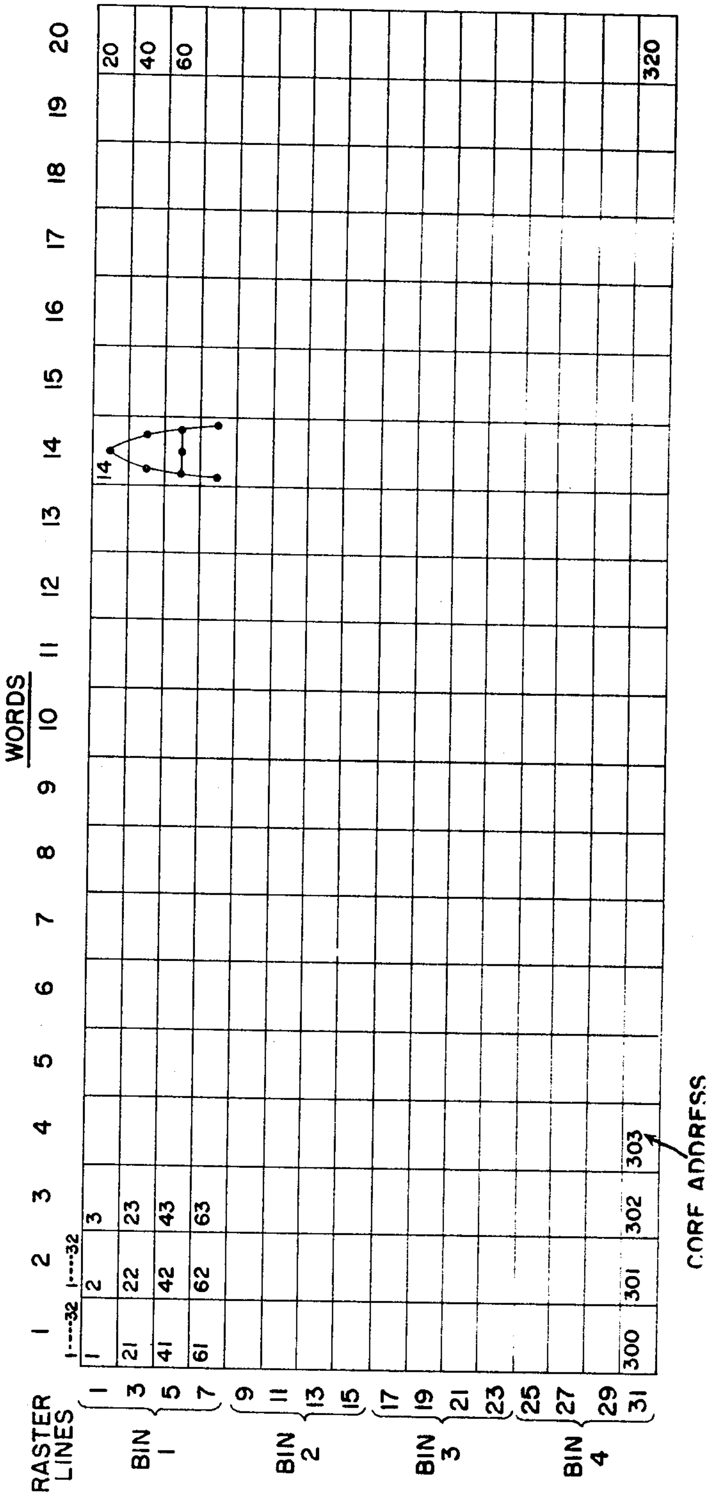
FIG.5
INVENTOR:
FREDERICK D. STROUT,
BY Norman C. Fulmer
HIS ATTORNEY.

INVENTOR
FREDERICK D. STROUT,

BY *Norman C. Fulmer*
HIS ATTORNEY.

INVENTOR:
FREDERICK D. STROUT,
BY Norman C. Fulmer
HIS ATTORNEY.

INVENTOR:
FREDERICK D. STROUT,
BY Norman C. Fulmer
HIS ATTORNEY.

VIDEO GENERATOR FOR DATA DISPLAY

BACKGROUND OF THE INVENTION

The invention is in the field of electronic data display apparatus, and more particularly relates to circuitry for converting randomly occuring data signals which, for example, are in binary form as supplied from a computer or other source, into sequential video signals for actuating a scanned-raster display device. Among the many uses for such equipment is the display data may represent medical information, pressure, rocket nozzle temperature, and dozens of other data which must be displayed and which must be frequently changed or updated at a rapid rate.

Various types of systems have been devised for displaying data. One such system employs a set of character masks, along with optical or electron-beam means for projecting various characters from the masks onto various of a display screen. Another type of system employs logic circuits for causing an electron beam to move and jump over a display screen in a manner to form readable characters. A third type of system, of which the present invention is an improvement, employs circuitry for converting the data into a sequential video signal which is used to modulate a scanned-raster television tube or other suitable display device. Such a system is described in U.S. Pat. No. 3,396,377, to F. D. Strout and assigned to the same assignee as the present invention. The circuits of such a system are required to convert the incoming data, and data changes or up-dating, which occur randomly with respect to time, into a suitable video signal for the raster-scanned display device. Complex circuitry is required for rapid up-dating of the data display, and there has been a need for circuit simplification and also for increased speed of operation. Since these requirements appear to be mutually incompatible, it has seemed unfeasible to achieve them simultaneously.

SUMMARY OF THE INVENTION

Objects of the invention are to provide an improved video generator circuit for data display, and to provide such a circuit which is both rapid in operation and relatively simple and inexpensive, as compared with prior-art circuits.

The invention comprises, briefly and in a preferred embodiment, video generator circuitry comprising a video image buffer of relatively small storage capacity connected to receive random video pattern signals and functioning to convert them into a sequential video output signal suitable for actuating a scanned-raster display device. In accordance with a feature of the invention, the aforesaid video image buffer has a considerably smaller storage capacity than would be required for storing the video signal bits for a complete raster field, and this is achieved by arranging the video pattern signals in the video image buffer into storage "bins" each representing display information for a small number of raster lines; means are provided for cyclically reading video information out from, and writing video information into, the various bins in a time sequence such that the video image buffer is always processing video information only for raster lines in the vicinity of the raster line being scanned the display device at each interval of time. A data buffer provided with thread address means functions to sort the incoming random data into proper "bins" for the video image buffer, and this sorted data is fed, bin after bin, to video pattern generators for generating the random video signals which are written into the video image buffer.

BRIEF DESCRIPTION OF THE DRAWINGS

FIG. 1 is an electrical block diagram of a preferred embodiment of the invention.

FIGS. 3, 4, and 5 illustrate the functioning of the video image buffer of FIG. 1.

DESCRIPTION OF THE PREFERRED EMBODIMENT

Figure 2:
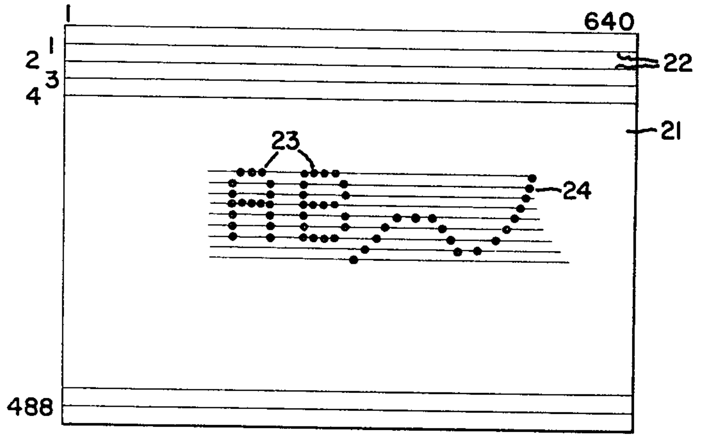
FIG. 2 illustrates the information of video patterns, such as characters and vectors, on a scanned-raster display.

Referring to FIG. 1, input data in the form of binary words is fed to a data receiver 11 over an input line 12 and may comprise data provided by computer or other source, this data representing rocket or spacecraft telemetry information, airline reservation information, stock market information, or other information to be displayed and subject to change and updating. The data receiver 11 functions as an interface unit for transferring the data words with proper timing and signal levels, and the output thereof is applied to the input of a data buffer 13 comprising a random access memory, the output thereof being connected to the inputs of a character generator 14 and a vector generator 15. A character library 16 is interconnected with the character generator 14. The outputs of the character generator 14 and vector generator 15 are connected to the input of a video image buffer 17 comprising a random access memory, the output of which is fed over a sequential video output signal line 18 to a cathode-ray tube or other display device. Control circuits 19 are connected to the data buffer 13 and video image buffer 17.

The character generator 14, vector generator 15, and character library 16, may be of the types described in the aforementioned U.S. Pat. No. 3,396,377. As described in the aforesaid patent, the character library 16 contains binary word video signal representations of a library of characters such as letters, numerals, and symbols. The character generator 14, under control of binary words from the data buffer 13 selects the desired characters (which are in digital form) from the library 16, and adds to the character video information an identification of the location on the display at which the character is to be presented, and applies this video information to the video image buffer 17. The vector generator 15, under control of binary words from the data buffer 13, generates video information binary words indicative of positions on the display screen where illuminated elements or "-dots" are desired in order to display vectors or special symbols not stored in the character library 16. The control circuits 19 provide suitable signals to the data buffer 13 and video image buffer 17 to control their timing and the sequences of reading information out from, and writing information into, these buffers.

The particular circuitry employed in the various blocks of FIG. 1 is immaterial in so far as the present invention is concerned, and various suitable circuitry is well known to those skilled in the art of computer design. The nature and functioning of the blocks shown in FIG. 1 will become more readily apparent from the following description of the invention, and from the more detailed block diagram of FIG. 8 which will be described subsequently. Understanding of the following description of the invention will be facilitated if it is borne in mind that the invention comprises the provision of a video image buffer 17 and also a data buffer 13 associated with the video image buffer 17, connected in and associated with the overall circuitry so as to function in the manner herein disclosed.

FIG. 2 illustrates a raster screen 21 of a display device which is sequentially scanned over a plurality of lines 22 by means of an electron beam or other suitable means, as in conventional television. The scanning means is modulated by the sequential video output signal from the video image buffer 17, so as to generate illuminated elemental areas or dots to form characters 23 or vectors or other shapes 24. These illuminated dots are sufficiently small and closely spaced so as to provide good readable characters. The embodiment to be described employs 488 visible raster scanning lines, and each of these lines is capable of illuminating 640 individual elemental areas or "dots". Thus, there is a total availability of 312,320 picture elements on the raster area. The 640 picture elements for each raster line are controlled by 20 binary words each having 32 bits (ones and zeros in standard binary parlance, of which, for example, the "ones" represent bright picture elements and the "zeros" represent dark picture elements). In accordance with usual practice the 20 words per line, for the 488 lines, or a total of 9,760 words may be stored on a rotating magnetic drum as described in the aforesaid U.S. Pat. No. 3,396,377, or may be stored in a core memory or other suitable storage device, and are read out and applied to the display device in synchronism with the scanning thereof. For interlaced scanning, in which each raster frame consists of two fields of alternate lines in conventional manner, two separate 4,880 word memories may be employed for storing the scanning information respectively for each field. The stored scanning information words are changed or updated as required, by means of data buffers or registers which sort and store the incoming data supplied by the computer or other source. If a greater number of lines is provided, the efficiency of the invention increases.

In accordance with the present invention, the storage of scanning video information words is achieved with a relatively small memory, having only that capacity which is required for storing the scanning information for the number of lines needed to accommodate the tallest character to be displayed, plus storage of some additional lines for achieving read-out of the information. In the preferred embodiment described herein, this storage consists of 320 word memory, for interlaced scanning (as compared to the aforesaid 9,760 word memory capability required in the prior art). In the preferred embodiment to be described, the tallest character stored in the character library is 16 raster lines in height, and the video image buffer 17 memory storage is arranged into four "bins", each bin representing eight raster lines for a total representation of 32 raster lines. Since interlaced scanning is used, the total storage capacity of the video image buffer is 16 field lines, representing alternate raster lines, each field line being represented by 20 words of 32 bits each for a total of 640 bits (picture elements) per line, whereby the video image buffer 17 of the invention has the aforesaid total storage capacity of 320 words instead of requiring the aforesaid larger capacity of 9,760 words as required in the prior art technique.

For convenience in describing and understanding the invention in detail, the organization and functioning of the video image buffer 17 will first be described, with reference to FIGS. 3, 4, and 5 of the drawing, followed by a description of the organization and functioning of the data buffer 13, with reference to FIGS. 6 and 7.

Figure 3:
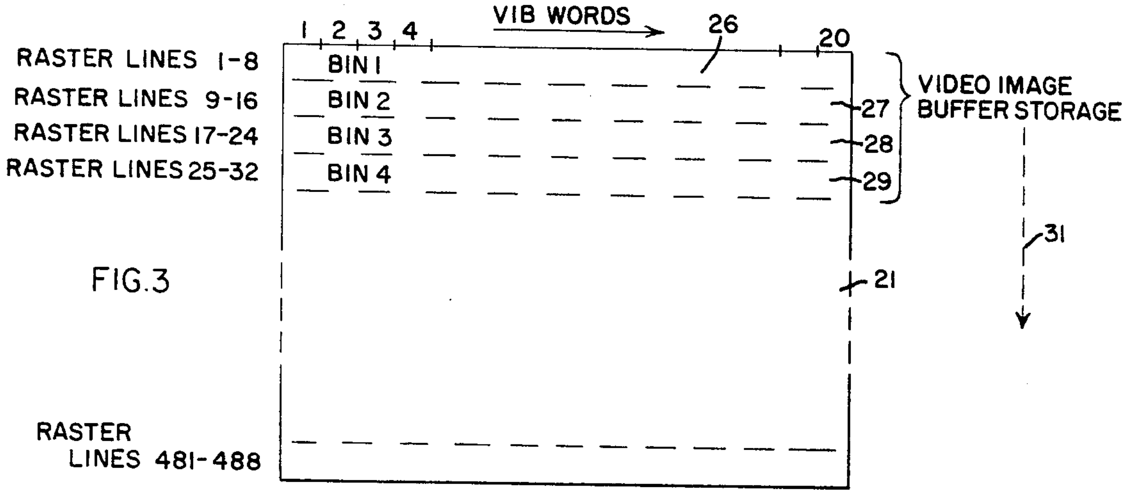

FIG. 3 illustrates the video image buffer organization and its changing relationship with respect to the display raster area 21.

The video image buffer storage capacity of 320 words is organized into four bins as indicated by the numerals 26, 27, 28, and 29. Each bin is associated with eight raster lines (four field lines) and contains 20 binary words per line for a total of 80 words per bin. The four adjacent bins initially are associated with the first 32 raster lines, and this association of bins to raster lines shifts downwardly, as indicated by the arrow 31, during each raster scanning. The first or upper bin is read sequentially, line after line, and the remaining three bins are written into randomly with respect to time.

Figure 4:
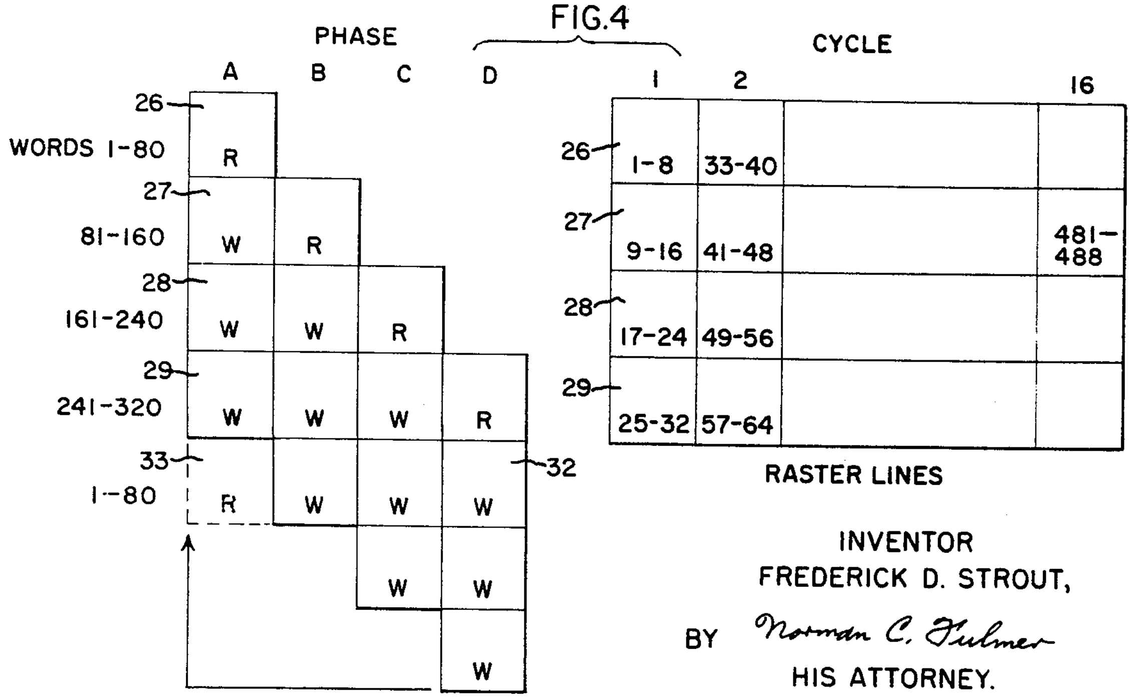

FIG. 4 illustrates the cyclical shifting of the storage bins with respect to the raster lines. During Phase A of the first cycle the four bins 26–29 are associated with raster lines 1 through 32, as shown in FIGS. 3 and 4. During Phase A, the first bin 26 is read out to the display device, a line at a time, in synchronism with the scanning of the raster, to properly modulate the electron beam or other scanning means for the first four field lines. Also, during Phase A, the three remaining bins are being randomly written into for achieving any desired updating or changes in the information contained therein. Three writing bins are provided, so as to accommodate the tallest character of 16 lines, since if the top of a character commenced near the bottom of a writing bin, a character would occupy portions of 16 lines in all three of the write bins. When the four field lines of words in bin 1 have been read out, Phase B commences and, as shown, the second bin becomes the read bin and now is bin number 1; the former bin number 1 (in Phase A) shifts down to become bin number 4 in Phase B, and is a write bin. After the four lines of information have been read from bin 1 in Phase B, a similar shifting of bins takes place for Phase C; this is again repeated for Phase D, upon the completion of which the second bin 32 of Phase D becomes the first bin 33 for Phase A of the second cycle. The procedure continues, with the video image buffer storage bins shifting downwardly, a bin at a time after the contents of each read bin containing four lines of information has been fed out to the display device. Upon completion of a complete field scan, the association of storage bins with respect to the raster scanning area shifts to the top of the raster, as in FIG. 3.

FIG. 5 shows in detail the organization of the video image buffer storage. 320 addresses are provided for storing 320 binary words of 32 bits each, arranged into 20 words per line, for 16 lines. The particular time intervals represented corresponds to that shown in FIG. 3, i.e. the time interval during which the raster area represented by the first eight lines is being scanned. FIG. 5 represents an odd-line field, in which bin 1 consists of the binary words for displaying the contents of lines 1, 3, 5, and 7. The binary words are written into the correct address locations of the video image buffer by the combined actions of the control circuits 19, the character and vector generators 14 and 15, and the thread address data buffer 13, which will be described subsequently. By way of example, FIG. 5 shows how the letter "A" is stored at a particular location of addresses in the video image buffer 17. The binary words stored in addresses 14, 34, 54, and 74 contain binary "ones", indicating illuminated picture areas, at suitable locations in their addresses to form portions of the letter A on the odd-lines. The stored binary character words may extend over a plurality of addresses horizontally as well as vertically. During the next field, the video image buffer storage will constitute suitable binary words for properly illuminating the even raster scanning lines for the letter A. Thus, the binary words are read out of addresses 1 through 20, in synchronism with the scanning of the display device, line 1 on the display device will contain suitably illuminated elemental areas for displaying the desired characters. Similarly, lines 3, 5, and 7 are sequentially read out from the image buffer in synchronism with the display device scanning, whereupon bin 2 becomes the read-out bin for the next four interlaced scanning lines. This repetitive sequence provides a video display which is capable of rapid change or updating in accordance with the input data words supplied to the data receiver 11.

Figure 6:
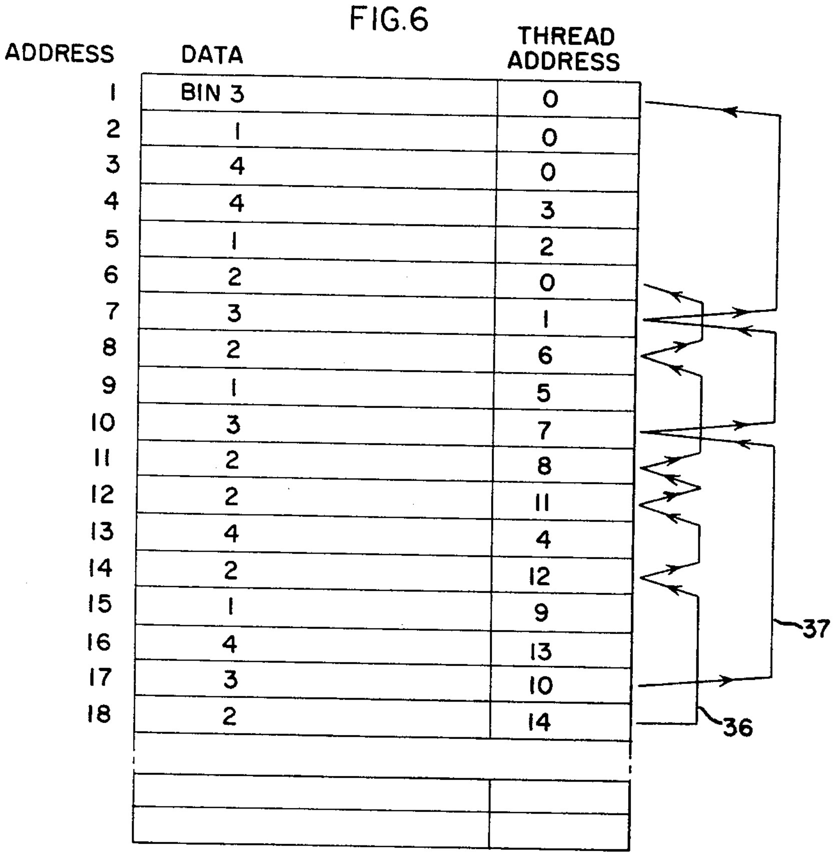
FIGS. 6 and 7 illustrate the functioning of the data buffer of FIG. 1.
Figure 7:
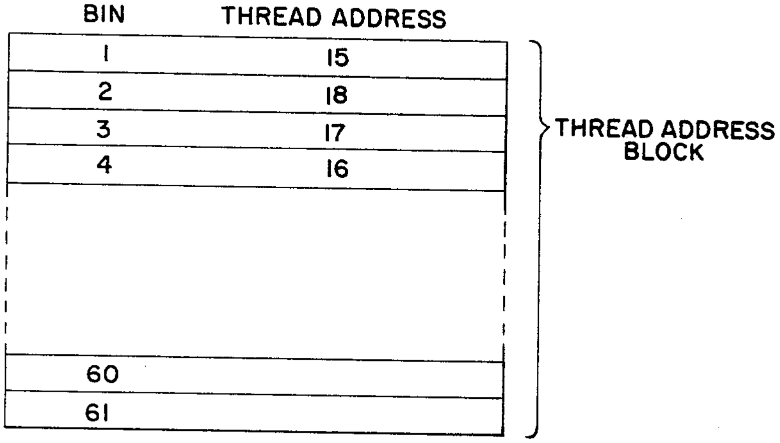

FIG. 6 and 7 illustrate the functioning of the data buffer 13, which makes use of the well-known threaded address technique. As shown in FIG. 7, the data buffer 13 contains storage for 61 bins of four lines each in the interlaced scanning example described herein. FIG. 7 shows the last threaded address in the data buffer for each bin, i.e., the address of the last word fed into each bin of storage. For example, the address for the last word fed into bin 1 is listed as address 15. Referring to FIG. 6, we find that address 15 contains data for bin 1, and the next preceding address for bin 1 is nine. Looking at address nine in FIG. 6, we find that it contains information for bin 1, and the next preceding address is five. Continuing in this manner, we proceed to address 2 where the thread address numeral zero indicates that there are no preceding addresses for bin 1. The arrow lines 36 and 37 at the right of FIG. 6 indicate the thread sequences for bins 2 and 3, respectively. A similar address technique is employed for the remainder of the 61 bins of storage in the data buffer 13.

Each time a new bin of information is to be read into the video image buffer 17, the appropriate bin of information is read out from the data buffer 13, utilizing the thread address technique, and fed to the character and vector generators 14 and 15 which convert the data words into video binary words which are written into the video image buffer 17. The 61 bins of storage in the data buffer 13 represent four lines each, for a total of the 244 lines per field of interlaced scanning. This is the same total storage capacity required for the data-sorting buffer registers utilized in the prior art systems. The data buffer 13 is updated for each field of scanning. A lower storage capacity data buffer can be used if only up-dating is required.

Figure 8:
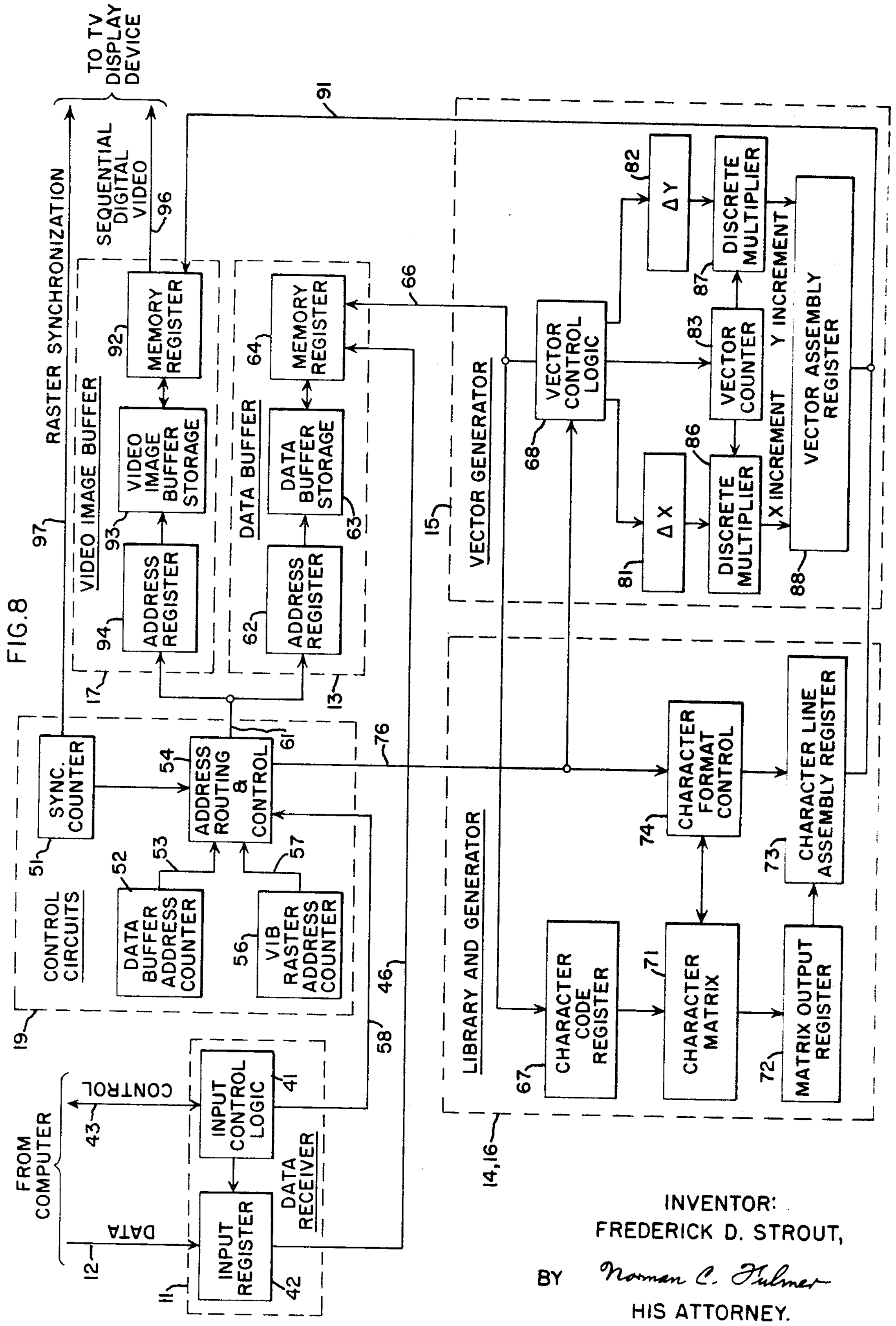
FIG. 8 is a block diagram illustrating an implementation of the circuit of FIG. 1.

Now referring to FIG. 8, which shows a preferred way of implementing the block diagram of FIG. 1, the data receiver 11 comprises input control logic circuitry 41 connected to control an input register 42 which is connected to receive the input data over the input data line 12. The input control logic circuitry 41 is interconnected with the computer by means of a control line 43, for effecting control of transfer timing of the input data. The input register 42 receives the input data over line 12, and furnishes this data, with proper timing, over an output line 46.

The control circuits 19 include a synchronization counter 51, and a data buffer address counter 52 connected over a line 53 for controlling an address routing and control circuitry 54. A video image buffer raster address counter 56 is connected by means of a line 57 to the address routing and control circuitry 54. The input control logic circuit 41 of the data receiver 11 also is connected, via a line 58, to the address routing and control circuit 54. The output of the address routing and control circuitry 54 is fed over a line 61 to an address register 62 in the data buffer 13. The address register 62 controls the address routing in a data buffer storage unit 63. The data buffer 13 also includes a memory register 64 interconnected with the data buffer storage 63. Data input to the data buffer 13 is supplied over the line 46, to the memory register 64. The output of the memory register 64 is applied over a line 66 to a character code register 67 located in the character library and generator 14, 16; and to vector control logic circuitry 68 in the vector generator 15.

The character library and generator 14, 16 also comprises a character matrix 71 to which is fed the output of the character code register 67; the output of the character matrix 71 is applied to a matrix output register 72, the output of which is fed to a character line assembly register 73. A character format control circuit 74 is connected to control both the character matrix 71 and the character line assembly register 73, and in turn is controlled by the address routing and control circuits 54, via line 76.

The vector control logic circuit 68 of the vector generator 15 also is controlled by the address and routing control circuit 54, via line 76, and control outputs thereof are applied to a Δ X circuit 81, a Δ Y circuit 82, and a vector counter 83. The outputs of the Δ X circuit 81 and Δ Y circuit 82 are respectively applied to discrete multipliers 86 and 87, both of which are timed and controlled by the vector counter 83, whereby the output of the discrete multiplier 86 is an X increment which is applied to a vector assembly register 88, and the output of the discrete multiplier 87 is a Y increment which is also applied to the vector assembly register 88.

The output of the character line assembly register 73, which constitutes the output of the character generator 14, and also the output of the vector assembly register 88, which constitutes the output of the vector generator 15, are applied via a line 91 to an input of a memory register 92 in the video image buffer 17. The video image buffer 17 also includes a video image buffer storage 93 interconnected with the memory register 92, and an address register 94 connected to be controlled by the address routing and control circuitry 54, via line 61, and providing as its output an address identification that is applied to the video image buffer storage 93. A sequential digital video output signal is provided by the memory register 92 of the video image buffer 17, and is applied via a line 96 to the electron beam modulation electrode of a cathode-ray tube or other suitable display device. An output of the synchronization counter 51 in the control circuits 19 also is applied, over a line 97, to the deflection system of the display device, so that the sequential digital video signal from the memory register 92 will be properly synchronized with the scanning of the display device.

The circuit of FIG. 8 functions as follows. The data supplied over line 12 from the computer, consists of binary words in a format which may be that described in the above mentioned U.S. Pat. No. 3,396,377, in which the binary data words identify the character desired and its location, or alternatively identify raster location of segments of vectors or curves. This data occurs randomly with respect to time and with respect to the locations of the images on the raster of the display device. The input register 42, under control of the input control logic 41, properly adjust the binary data words as to amplitude and the timing, and they are fed into the memory register 64 of the data buffer 13 from where they are written into the data buffer storage 63. The address register 62 keeps track of a threaded address, for sorting the stored data into bins, which is accomplished under control of the address routing and control circuits 54 and data buffer address counter 52. The thread address words are read out from the data buffer storage 63, via the memory register 64, organized into bins of random words of data (that is, random with respect to time) which is fed to the character generator 14 and vector generator 15.

The character matrix 71 stores a library of predetermined characters, and functions as the character library 16 of FIG. 1. The data words fed into the character code register 67 cause selection of the proper characters from the character matrix 71, which are in the form of binary words representing portions of successive scanning lines, for example as shown in FIG. 5 for the video image buffer storage addresses 14, 34, 54, and 74. The character information, combined with raster location information in the character line assembly register 73, is fed through line 91 into the memory register 92 of the video image buffer 17.

The output of the vector generator 15 also is applied to the memory register 92 via line 91, and is generated by means of generating the X increment and Y increment in the discrete multipliers 86 and 87, the magnitudes of these increments being determined by timing of the vector counter 83 in response to information in the binary data input words. Vectors that exceed the vertical heights of the video image buffer bins will be generated as separate segments. This is accomplished by returning the contents of the vector registers and counters to the threaded list of the data buffer in order that vector generation may continue at a later time in the scanning sequence. The binary output words of the character generator 14 and vector generator 15 are binary video signal words occurring randomly with respect to time since they are generated in response to the random input data from the computer as applied to the data receiver 11. The binary video words that are applied to the memory register 92 via the line 91 which have been sorted into bins by the data buffer 13, are written into the video image buffer storage 93, a few bins at a time as has been described above with reference to FIGS. 3, 4, and 5. The "top" bin of stored binary video words is read out from the video image buffer storage 93, via the memory register 92, on a line by line basis, whereby sequential digital video signals are fed via line 96 to the display device. Proper addressing of the video binary words in the video image buffer storage 93 is achieved by means of the address register 94 and its control by the address routing and control circuits 54. Although FIG. 8 shows a preferred implementation of the invention, various other suitable implementations will occur to those skilled in the computer art, once the invention is understood from FIG. 1 and the foregoing description thereof.

Various numbers of bins, and storage lines per bin, may be provided in the video image buffer, the choice depending mainly on considerations of economics, speed desired, and maximum height of stored characters to be displayed. As has been described above, the video image buffer storage capacity preferably is sufficient to store video words representative of one and a half times the number of display lines required for the tallest stored character plus some additional lines for the read-out function. For a field sequential display, this storage capacity will be half of the number of raster-lines to be represented. The bins preferably constitute equal numbers of lines, since the bins sequentially shift with respect to the raster area represented and also with respect to their read-write functioning. Therefore, the arrangement described herein of four bins of equal size is a preferred embodiment.

While a preferred embodiment of the invention has been shown and described, various other embodiments and modifications will become apparent to persons skilled in the art, and will fall within the scope of the invention as defined in the following claims.

What I claim is:

1. A video generator circuit for converting randomly occurring input signals into a time-sequential video signal for use with a sequentially line scanned display device, wherein the improvement comprises, in combination, a video image buffer having a utilized storage capacity less than that required for storing a complete video display image, input means connected to said video image buffer storage and adapted for writing therein video signals which represent information to be displayed on a number of scanned lines of said display device following the line currently being scanned, output means connected to said video image buffer storage and adapted for reading out therefrom the video information stored therein representing said line currently being scanned, and sorting means for organizing the information stored in said video image buffer into a plurality of storage bins each associated with a number of successive scanning lines of said display device, said output means being adapted to sequentially read out the video information for the successive scanning lines of the first of said bins, said input means being adapted to write random video information into the remaining storage bins, and means for causing said organization of bins to shift upon completion of read-out of said first bin whereby the next successive bin becomes the first bin and is read out and whereby the original first bin becomes the last write bin.

2. A circuit as claimed in claim 1, in which each of said storage bins is associated with a same given number of scanning lines.

3. A circuit as claimed in claim 1, including a stored library of signals representing predetermined video patterns extending over a number of scanning lines, said input means being adapted to write said predetermined video pattern signals into said write bins of the video image buffer storage, the number of scanning lines represented by said write bins being equal to at least one and a half the maximum number of scanning lines over which said predetermined video patterns extend.

4. A circuit as claimed in claim 4, in which said bins comprise three write bins and one read bin.

5. A circuit as claimed in claim 1, including a vector generator for generating video signals representing graphical lines of given length and direction in accordance with said input signals, said input means being adapted to write said video signals representing graphical lines into said write bins of the video image buffer storage.

6. A circuit as claimed in claim 1, in which said sorting means comprises a data buffer connected with said input means and comprising storage means and thread address means for sorting random input data into said bins for writing into said video image buffer storage.

7. A circuit as claimed in claim 6, including a character generator provided with a stored library of character signals and connected to receive the output signals of said data buffer, and means connecting the output of said character generator to the input of said video image buffer.

8. A circuit as claimed in claim 6, including a vector generator for generating video signals representing graphical lines of given length and direction in accordance with said input signals, said vector generator being connected to receive the output signals of said data buffer, and means connecting the output of said vector generator to the input of said video image buffer.

9. A video generator circuit for converting randomly occurring data signals into a time-sequential video signal for use with a sequentially line scanned display device, wherein the improvement comprises, in combination, a data receiver connected to receive said data signals, a data buffer connected to the output of said data receiver and adapted to sort said data signals into a first plurality of bins each representing a small number of the lines to be scanned on said display device, a video pattern generator connected to the output of said data buffer, a video image buffer connected to the output of said pattern generator and having a utilized storage capacity arranged into a second relatively smaller plurality of bins each representing a number of lines corresponding to the bins of said first plurality, and control circuits connected to said data buffer and video image buffer and operative to cause sequential read-out of a first bin of stored video signals from said video image buffer and writing of video signals outputted from said data buffer into other bins of said video image buffer, said control circuits being further operative upon completion of read-out of said first bin to shift the bin read-write sequence whereby the next successive bin becomes the first bin and is read out and whereby the original first bin becomes the last write bin.

* * * * *